United States Patent
Arima et al.

(10) Patent No.: US 6,332,571 B1
(45) Date of Patent: Dec. 25, 2001

(54) CONSUMER TRANSACTION FACILITY (75) Inventors: Yukiko Arima; Kiyotaka Awatsu; Akemi Oda, all of Maebashi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/414,501

(22) Filed: Oct. 8, 1999

(30) Foreign Application Priority Data

May 6, 1999 (JP) .................................................. 11-126054

(51) Int. Cl.$^7$ .................................................. G06F 17/60
(52) U.S. Cl. .............................. 235/379; 902/14; 902/15
(58) Field of Search .................................... 235/379, 375, 235/380; 902/8, 13, 14, 15, 17, 20, 21; 705/43; 222/639, 641

(56) References Cited

U.S. PATENT DOCUMENTS

| | | | |
|---|---|---|---|
| 4,593,183 | * | 6/1986 | Fukatsu .................................. 235/379 |
| 5,017,026 | * | 5/1991 | Takesako et al. ...................... 235/379 |
| 5,146,068 | * | 9/1992 | Ugawa et al. .......................... 235/379 |
| 5,597,996 | * | 1/1997 | Flood ..................................... 235/379 |
| 5,610,382 | | 3/1997 | Yamamoto ............................. 235/379 |
| 5,929,413 | * | 7/1999 | Gardner ................................. 235/379 |
| 6,073,120 | * | 1/2000 | Shiota et al. .......................... 235/379 |
| 6,176,423 | * | 1/2001 | Egami .................................... 235/379 |
| 6,196,457 | * | 3/2001 | Patterson .............................. 235/379 |

FOREIGN PATENT DOCUMENTS

| | | |
|---|---|---|
| 59-20075 | 2/1984 | (JP) . |
| 62-113225 | 5/1987 | (JP) . |
| 64-70870 | 3/1989 | (JP) . |

* cited by examiner

Primary Examiner—Karl D. Frech
Assistant Examiner—Larry D Taylor
(74) Attorney, Agent, or Firm—Staas & Halsey LLP (57) ABSTRACT

There is provided a consumer transaction facility for performing a discharge of a medium including cash from a cover member in accordance with an operation of a customer. The consumer transaction facility is provided with a receiver having an operating button and a medium discharge control unit for discharging the medium from the cover member, and in a case where the medium is left at a lapse of a predetermined time, taking the medium into the cover member. The medium discharge control unit has time extension element for extending a time up to taking the discharged medium into the cover member in accordance with the operating button on said receiver after a discharge of the medium.

3 Claims, 6 Drawing Sheets

CONSUMER TRANSACTION FACILITY

BACKGROUND OF THE INVENTION

1. Field of the Invention

The present invention relates to a consumer transaction facility for performing consumer transactions for cash with a customer in accordance with an operation of the customer.

2. Description of the Related Art

Today, a consumer transaction facility, such as for example, an automatic teller machine (ATM) and a cash dispenser (CD), is installed in a bank and another financial institution. A customer inserts a magnetic card into the consumer transaction facility, enters a personal identification number, and inputs a withdrawal amount, so that the customer can withdraw one's savings.

Generally, a consumer transaction facility has a display of a touch keyboard so that a user performs various sorts of input through touching a portion on the display in accordance with an instruction displayed on the display. Further, in many cases, the consumer transaction facility has a receiver provided with buttons of a push-phone for a visually handicapped person. A visually handicapped person picks up the receiver and performs various sorts of input through an operation of the buttons of the receiver in accordance with an instruction by a voice from the receiver.

With respect to the consumer transaction facility, in some case, there is a possibility that a medium, such as bills, coins, a magnetic card and a passbook, which is discharged from the consumer transaction facility, is left without being pulled out by a customer. The consumer transaction facility copes with leaving the medium without being pulled out by a customer in the following manner. First, the consumer transaction facility watches whether the discharged medium is pulled out by a customer. In the event that the discharged medium is not pulled out by a customer within a predetermined time, an alarm sound is generated. The alarm sound makes it possible to call the customer's attention. After generation of the alarm sound, in the event that the discharged medium is not yet pulled out by the customer within a further predetermined time, the medium is taken in the inside of the consumer transaction facility. In this manner, the consumer transaction facility copes with leaving the medium without being pulled out by a customer.

However, in the event that a visually handicapped person is unaccustomed to dealing with a consumer transaction facility, it takes a long time for locating the place of the discharged medium, and it is difficult for the visually handicapped person to pull out the medium within a predetermined time which is suitable for coping with leaving the medium. Further, in a case where a state of pulling out wait (a state that a medium is not pulled out by a customer and is out of the consumer transaction facility) is continued for a long time, this involves a danger of theft of a medium. Thus, the conventional consumer transaction facility is unhelpful for a visually handicapped person as to pulling out of a medium.

SUMMARY OF THE INVENTION

In view of the foregoing, it is an object of the present invention to provide a consumer transaction facility capable of supporting a visually handicapped person as to pulling out of a medium such as discharged bills and a discharged card, and also preventing a theft.

To achieve the above-mentioned objects, the present invention provides a first consumer transaction facility for performing a discharge of a medium including cash from a cover member in accordance with an operation of a customer, said consumer transaction facility comprising:

a receiver having an operating button; and a medium discharge control unit for discharging the medium from the cover member, and in a case where the medium is left at a lapse of a predetermined time, taking the medium into the cover member, wherein said medium discharge control unit has time extension means for extending a time up to taking the discharged medium into the cover member in accordance with the operating button on said receiver after a discharge of the medium.

According to the consumer transaction facility as mentioned above, a time up to taking discharged medium into the cover member is allowed to be extended. Thus, a customer can pull out the medium with an enough time. Further, according to the consumer transaction facility as mentioned above, the extension of the time is performed in accordance with an operation of a customer. Thus, it does not happen that the medium discharged from the cover member are left in defenseless state for long time in accordance with the extension of the time. Therefore, it is possible to prevent a theft of the medium.

To achieve the above-mentioned objects, the present invention provides a second consumer transaction facility for performing a discharge of a medium including cash from a cover member in accordance with an operation of a customer, said consumer transaction facility comprising:

a receiver having an operating button; and a medium discharge control unit for discharging the medium from the cover member, and in a case where the medium is left at a lapse of a predetermined time, taking the medium into the cover member, wherein said medium discharge control unit has time interruption means for taking the discharged medium into the cover member in accordance with the operating button on said receiver after a discharge of the medium before a lapse of the predetermined time.

According to the consumer transaction facility as mentioned above, taking a medium discharged from the cover member into the cover member is performed in accordance with an operation by a customer before the lapse of the above-mentioned predetermined time. Thus, for example, in the event that the customer abandon to seek the medium by oneself and calls a person in charge, this taking in makes it possible to prevent a theft of the medium.

To achieve the above-mentioned objects, the present invention provides a third consumer transaction facility for performing a discharge of a medium including cash from a cover member in accordance with an operation of a customer, said consumer transaction facility comprising:

a receiver having an operating button; and a medium discharge control unit for discharging the medium from the cover member, and in a case where the medium is left at a lapse of a predetermined time, taking the medium into the cover member, wherein said medium discharge control unit has discharge extension means for extending a discharge of the medium in accordance with an operation of the operating button on said receiver before the discharge of the medium, and performing the discharge of the medium in accordance with a new operation of the operating button on said receiver.

According to the above-mentioned consumer transaction facility, a discharge of a medium is extended in accordance with an operation by a customer. Thus, a customer can make preparations during the extended period and prosecute work after a discharge of the medium having an enough time. Further, when the customer calls a person in charge, the discharge is kept interrupted. This feature makes it possible to prevent a theft of the medium.

DETAILED DESCRIPTION OF PREFERRED EMBODIMENTS

Hereinafter, there will be described embodiments the present invention.

Figure 1:
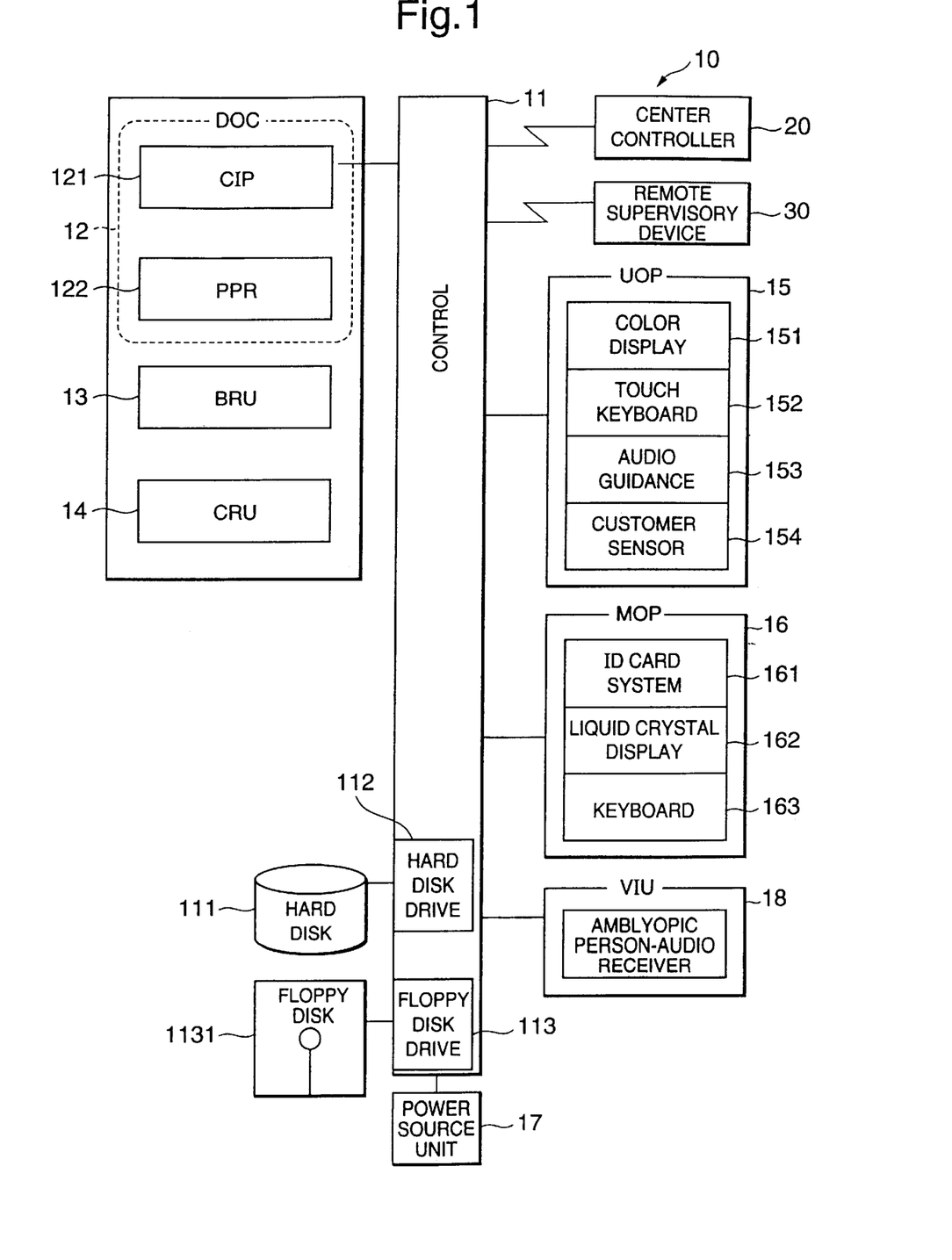
FIG. 1 is a block diagram of an internal structure of an ATM which is an embodiment of a consumer transaction facility according to the present invention.

FIG. 1 is a block diagram of an internal structure an ATM which is an embodiment of a consumer transaction facility according to the present invention.

An ATM 10 shown in FIG. 1 comprises a control unit 11, a DOC (Document Output and Card reader writer) 12, a BRU (Bill Recycle Unit) 13, a CRU (Coin Recycle Unit) 14, UOP (User Operating Unit) 15, an MOP (Management Operating Unit) 16, a power source unit 17, and a VIU (amblyopic person-audio receiver) 18.

The control unit 11 controls the ATM 10 in its entirety, and receives an instruction of a center controller 20 and informs the center controller 20 of a state of the ATM 10. The control unit 11 is also connected to a remote supervisory device 30 which monitors a customer operating the ATM 10 and the ATM 10 per se in accordance with information obtained from a customer sensor 154 provided on a UOP 15. The control unit 11 is provided with a hard disk 111 for storing a control program for controlling the ATM 10 and various sorts of data concerning the ATM 10, and a hard disk driver 112 for writing data and the like into the hard disk 111 and for reading data and the like from the hard disk 111. The control unit 11 is further provided with a floppy disk driver 113, on which a floppy disk 1131 is loaded, for reading data from the floppy disk 1131 and for writing data into the floppy disk 1131.

The DOC 12 deals with a cash card and a passbook and comprises a CIP (Card reader/writer Image reader Printer) 121 having functions of reading contents recorded on a magnetic stripe of a cash card and recording transaction contents on a receipt, and a PPR (Passbook Printer) 122 having a function of recording for a passbook.

The BRU 13 deals with money receipt and payment for bills with a user (customer) of the ATM 10. When bills are entered to the ATM 10 by the user of ATM 10, the BRU 13 classifies the bills for each sort of bill to store those bills. When bills are paid from the ATM 10 to a user, the BRU 13 performs a payment using bills which are classified and stored beforehand.

The CRU 14 deals with money receipt and payment for coins with a user (customer) of the ATM 10.

The UOP 15 is a user operating unit in which a user (customer) of the ATM 10 performs an operation for money receipt and payment. The UOP 15 comprises a color display 151 for displaying information for customers, a touch keyboard 152 for inputting a customer's PIN and sums, an audio guidance 153 for performing an audio guidance necessary for customers, and a customer sensor 154 for detecting whether a customer stands in front of the ATM 10 so that detected information is reflected on operations of the color display 151 the audio guidance 153.

The MOP 16 is operated by a member of the staff and the like of a financial institution in which the ATM 10 is set up. The MOP 16 comprises an ID card system 161 for controlling an electromagnetic lock referring to an IC card for confirming that he is a person who is authorized in operation of the MOP 16, a liquid crystal display 162 for displaying information for the operation, and a keyboard 163 for operation.

A power source unit 17 supplies electric power necessary for the ATM 10.

The VIU 18 is a receiver in which push-phone type of buttons are arranged. It is possible for an amblyopic person to enter one's PIN and sums through an operation of the push-phone type of buttons in accordance with an audio guidance by the receiver, but not an operation of the touch keyboard 152.

Figure 2:
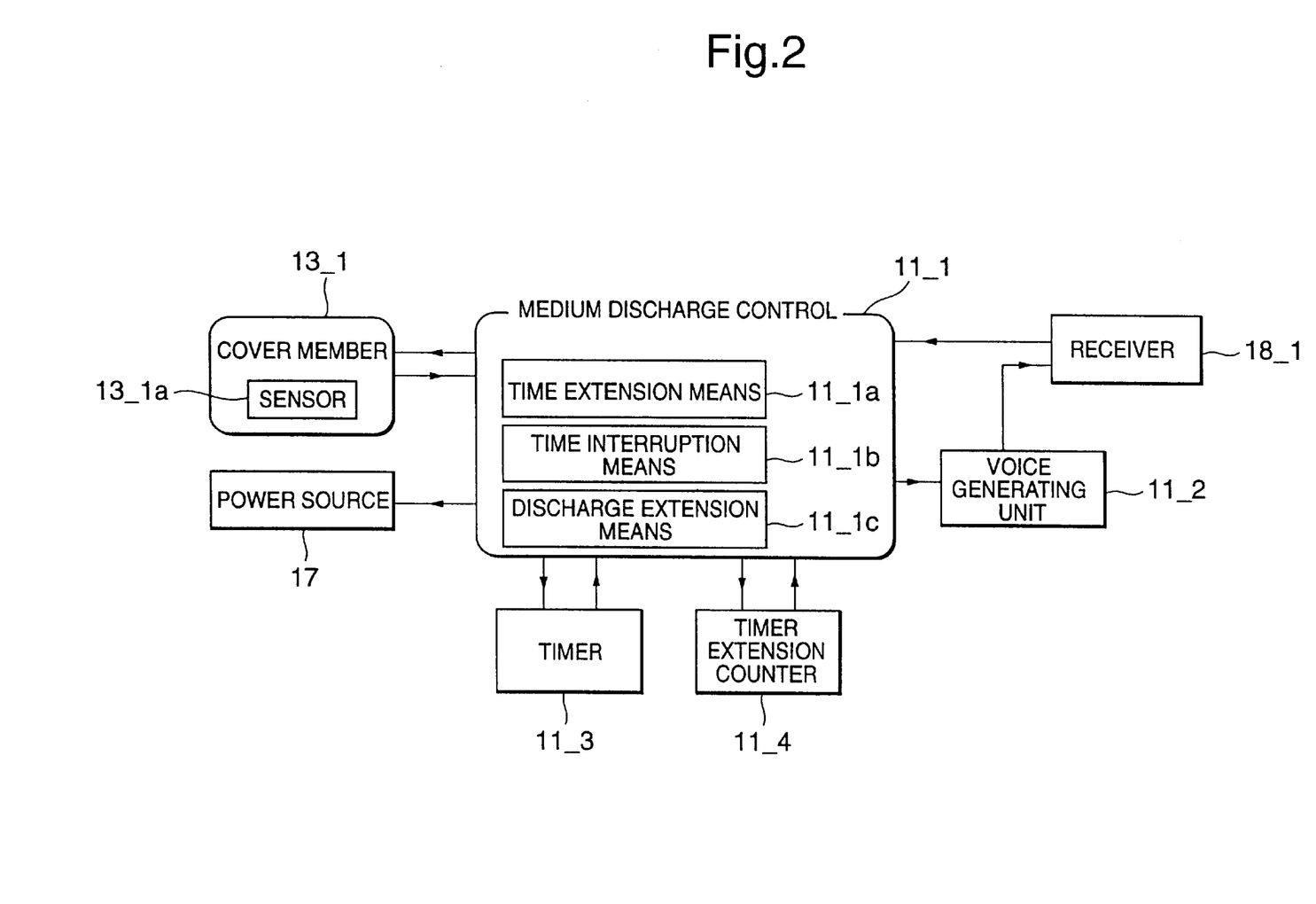
FIG. 2 is a functional block diagram of the ATM shown in FIG. 1.

FIG. 2 is a functional block diagram of the ATM shown in FIG. 1.

The ATM comprises a receiver 18_1, a cover member 13_1, a medium discharge control unit 11_1, a voice generating unit 11_2, a timer 11_3, and the power source unit 17.

The cover member 13_1 corresponds to a portion of the cover member for temporarily storing bills in the BRU 13. The cover member 13_1 is provided with a sensor 13_1a for watching whether a discharged bill is pulled out by a customer. Hereinafter, with regard to the cover member, there will be given an explanation taking notice of only the cover member for storing bills, including an explanation of an operation of the ATM according to the flowchart which will be described later. It is noted that not only the BRU 13, but also the CIP 121, the PPR 122, and CRU 14 shown in FIG. 1 have their associated cover member portions, respectively. Their associated cover member portions are the same as that of the BRU 13 in the point that the medium is stored, but different from that of the BRU 13 only in the point that a sort of the medium to be stored is a card, a passbook, and coins, but not bills. Thus, it is possible to understand that the cover member 13_1 represents any of the cover member portions of the CIP 121, the PPR 122, and CRU 14 as well as the BRU 13.

A receiver 18_1 corresponds to VIU 18 shown in FIG. 1. The medium discharge control unit 11_1 controls and executes a discharge of bills from the cover member 13_1 and a receipt of bills into the cover member 13_1 on the basis of an instruction according to a button operation of a customer through the receiver 18_1 and a time elapsed indicated by the timer 11_3. The medium discharge control unit 11_1 corresponds to a combination of the control unit 11 shown in FIG. 1 and the driving portion for discharge and receipt of bills of the BRU 13. The voice generating unit 11_2 reads an order issued from the medium discharge control unit 11_1 according to a button operation of a customer through the receiver 18_1 and a time elapsed indicated by the timer 11_3, and generates an alarm sound to be transmitted to the receiver 18_1 and a voice for a guide.

In the event that the sensor 13_1a detects that after the timer 11_3 counts a predetermined time (a silent timer time) since a bill is discharged from the cover member 13_1, the discharged bill is left without being pulled out by a customer, the medium discharge control unit 11_1 causes the voice generating unit 11_2 to generate an alarm sound to call the customer's attention through the receiver 18_1. And in the event that the sensor 13_1a detects that after the timer 11_3 counts a further predetermined time (a sound timer time) since a generation of the alarm sound is started, the discharged bill is still left without being pulled out by the customer, the medium discharge control unit 11_1 takes in the inside of the cover member 13_1.

The medium discharge control unit 11_1 comprises time extension means 11_1a, time interruption means 11 1b, and discharge extension means 11_1c, and performs discharge and receipt of bills in accordance with a button operation of a customer on the receiver 18_1.

In the event that a bill discharged from the cover member 13_1 is still left without being pulled out by a customer, when the customer pushes a predetermined button for example, "#" button on the receiver 18_1, the time extension means 11_1a resets the timer 11_3 to return a situation to an initial state so that a time up to the receipt of the bill to the cover member 13_1 is extended. A number of times of extension of time is counted by a timer extension counter 11_4. Hereinafter, it is assumed that "#" button is set up as a key for resetting the timer and resuming a timer operation when it is depressed.

Likely, in the event that a bill discharged from the cover member 13_1 is still left without being pulled out by a customer, when the customer pushes a predetermined button for example, "*" button on the receiver 18_1, the time interruption means 11_1b takes the left bill in the cover member 13_1 without waiting the lapse of the predetermined time. The discharge extension means 11_1c extends a discharge of bills in accordance with a button operation on the receiver 18_1 by a customer, before the bill is discharged from the cover member 13_1, and performs the discharge of bills in accordance with a button operation on the receiver 18_1 by the customer. Hereinafter, it is assumed that "*" button is set up as a key for interrupting a discharge of bills or taking discharged bills in the cover member 13_1 when it is depressed.

Next, there will be described details of control and execution of discharge and receipt of a medium by the time extension means 11_1a, the time interruption means 11_1b, and the discharge extension means 11_1c in conjunction with the flowcharts of FIGS. 3 and 4.

Figure 3:
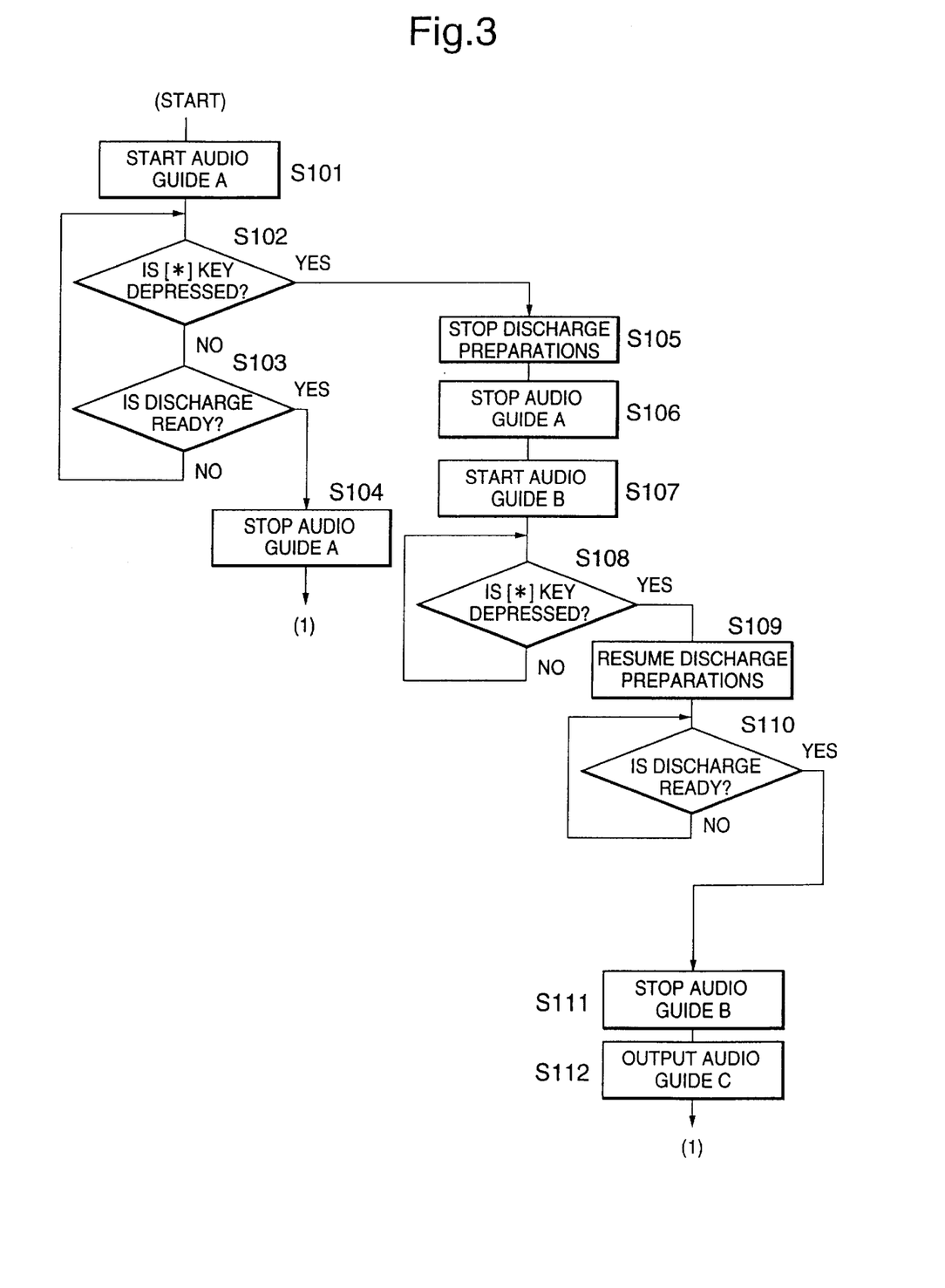
FIG. 3 is a flowchart useful understanding an operation of the ATM shown in FIG. 1 before discharge of a medium.

FIG. 3 is a flowchart useful understanding an operation of the ATM shown in FIG. 1 before discharge of a medium.

First, it is assumed that at the time of a start, a discharge of bills is determined.

In step S101, an audio guide A that "Now on processing. Bills will be discharged soon. Please depress "*" button when you are not ready to receive bills.", which is generated by the voice generating unit 11_2, is announced from the receiver 18_1. Then, the process goes to step S102~step S103.

In step S102~step S103, the medium discharge control unit 11_1 makes preparations for a discharge of bills, and watches whether a customer depressed "*" button on the receiver 18_1 during the preparations. In the event that a customer depressed "*" button on the receiver 18_1 during the preparations, the process goes to step S105~step S107. On the other hand, in the event that a customer did not depress "*" button on the receiver 18_1 during the preparations, when the preparations are completed, the process goes to step S104.

In step S104, the audio guide A is terminated.

Figure 4:
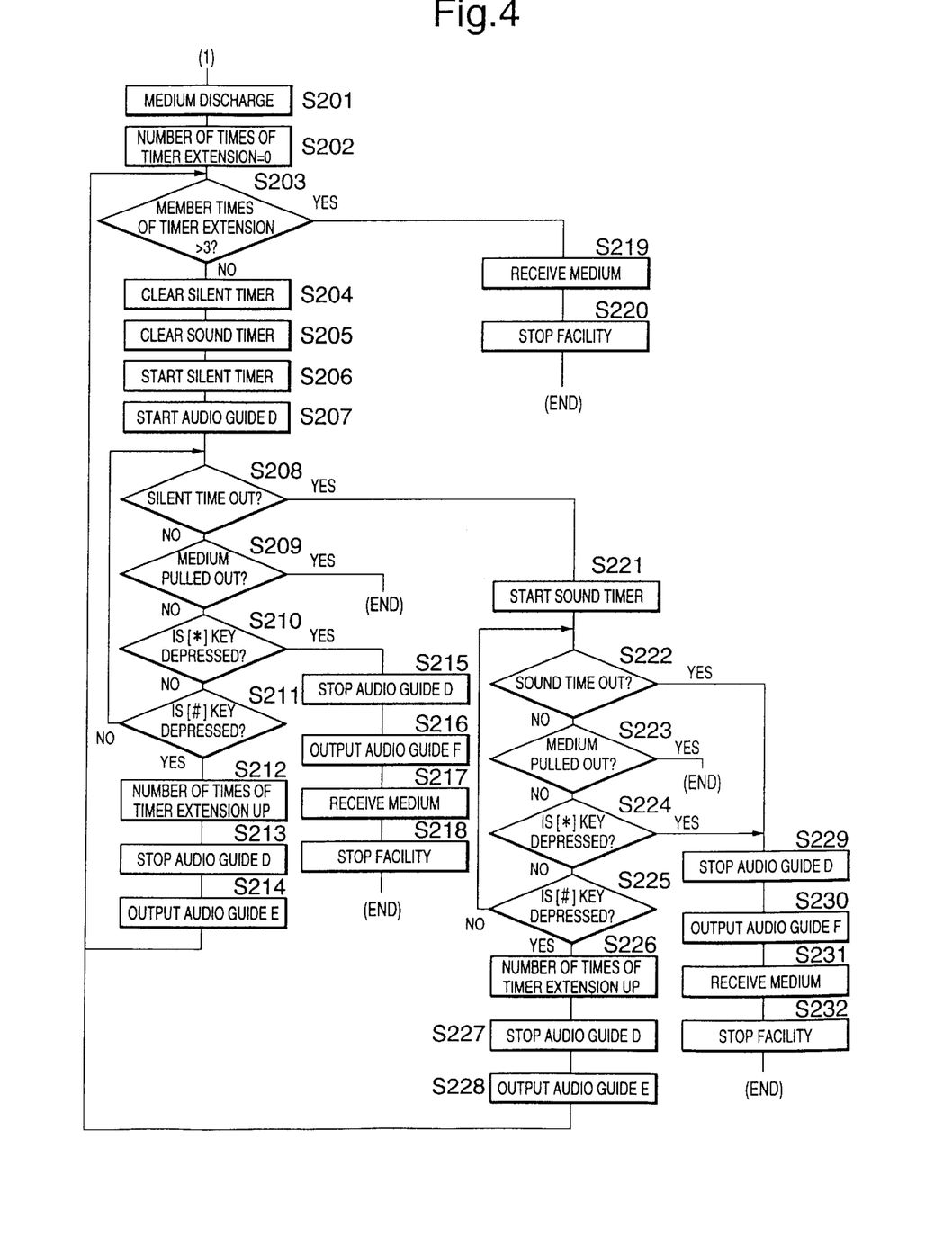
FIG. 4 is a flowchart useful understanding an operation of the ATM shown in FIG. 1 after discharge of a medium.

Next, the process goes to step S201 shown in FIG. 4.

In step S105~step S107, upon receipt of depression of "*" button, the discharge extension means 11_1c of the medium discharge control unit 11_1 interrupts preparations of a discharge of bills, and causes the voice generating unit 11_2 to terminate the audio guide A and causes the voice generating unit 11_2 to generate an audio guide B that ""*" button is depressed, isn't it. A discharge will be interrupted. Please depress "*" button again when you are ready to receive bills". Then, the audio guide B is announced from the receiver 18_1. Next, the process goes to step S108~step S112.

In step S108~step S112, upon receipt of depression of "*" button by a customer, the discharge extension means 11_1c causes the voice generating unit 11_2 to terminate the audio guide B immediately if the preparation for a discharge of bills has been completed, and if the preparation for a discharge of bills is not yet completed, when the preparation is completed, and causes the voice generating unit 11_2 to generate an audio guide C that ""*" button is depressed, isn't it. A discharge of bills will be started.". Next, the process goes to step S201 shown in FIG. 4.

In this manner, according to the above-mentioned ATM, a discharge of bills is extended in accordance with a button operation by a customer on the receiver 18_1. Thus, a customer can make preparations during the extended period and prosecute work after a discharge of a medium having an enough time.

FIG. 4 is a flowchart useful understanding an operation of the ATM shown in FIG. 1 after discharge of a medium.

In step S201, the medium discharge control unit 11_1 discharges a bill from the cover member 13_1, and the process goes to step S202 in which upon receipt of a discharge of bills by the medium discharge control unit 11_1, the timer extension counter 11_4 clears the number of times of timer extension to set up 0. Then the process goes to step S203 in which it is determined whether the number of times of timer extension of the timer extension counter 11_4 is more than 3. In the event that the number of times of timer extension is not more than 3, the process goes to steps S204~S207. In the event that the number of times of timer extension is more than 3, the process goes to steps S219~S220.

In steps S219~S220, the medium discharge control unit 11_1 takes the bills in the cover member 13_1, and a part of the power source of the power source unit 17 is turned off so that the ATM stops.

In steps S204~S207, a silent timer and a sound timer of the timer 11_3 are reset to 0, and then the silent timer starts. As the silent timer starts, the voice generating unit 11_2 starts a generation of an audio guide D that "Please take bills before your right hand. To extend the pulling out timer, please depress # below your right hand. To interrupt the pulling out, please depress "*" below your left hand.". And the audio guide D is announced through the receiver 18_1. Here, as the medium, bills are considered. However, in the event that other than the bill as the medium is considered, the audio guide is changed in accordance with the situation, for example, in such a manner that "Please take bills before your right hand" is replaced by "Please take a card before your right hand", "Please take a passbook before your left hand" or "Please take coins before your left hand". Next, the process goes to steps S208~S211.

In steps S208~S211, during an operation of the silent timer, if an customer does not pull out bills from the cover member 13__1 and the customer does not depress the button "*" or the button "#", after the lapse of a predetermined time (a silent timer time), the process goes to step S221 in which the sound timer starts.

During an operation of the silent timer, if an customer pulls out bills from the cover member 13__1, the ATM terminates an operation for providing bills to a customer.

During an operation of the silent timer, if an customer does not pull out bills from the cover member 13__1 and the customer depresses the button "*", the process goes to steps S215~S218.

In steps S215~S218, the time interruption means 11__1b causes the voice generating unit 11__2 to terminate the audio guide D and generate an audio guide F that "*, it is a pulling out interruption, isn't it. Bills will be taken in the facility. Please put the receiver back in its place, and push a call button and wait a minute.". The audio guide F is announced through the receiver 18__1, and the bills are taken into the cover member 13__1 by the time interruption means 11__1b. And a part of the power source of the power source unit 17 is turned off so that the ATM stops.

Returning the explanation of S208~S211, during an operation of the silent timer, if an customer does not pull out bills from the cover member 13__1 and the customer depresses the button "#" but not the button "*", the process goes to steps S212~S214.

In steps S212~S214, the time extension means 11__1a of medium discharge control unit 11__1 increments the number of times of timer extension of the timer extension counter 11__4 by one, and causes the voice generating unit 11__2 to terminate the audio guide D and generate an audio guide E that "#, it is a pulling out timer extension, isn't it. The pulling out timer will be extended.". The audio guide E is announced through the receiver 18__1. And the process goes to the step S203.

Next, there will be described a case where the process goes from the step S208 to step S221 in which the sound timer starts. In the step S221, the sound timer starts, so that the voice generating unit 11__2 generates an alarm sound calling a customer's attention to leaving bills The alarm sound is transmitted through the receiver 18__1 to a customer. Next, the process goes to step S222~step S232.

The operation of ATM in the step S222~the step S232 is similar to that in the step S208~the step S218 after a start of the silent timer, as will be described hereinafter.

Of the step S222~the step S232, in the step S222~the step S225, the operating timer is the sound timer, and the alarm sound is issued from the receiver 18__1. During an operation of the sound timer, if an customer does not pull out bills from the cover member 13__1 and the customer does not depress the button "*" or the button "#", after the lapse of a predetermined time (a sound timer time), the process goes to steps S229~S232.

In the steps S229~S232, the ATM performs the same operation as the steps S215~S218, and finally takes bills into the cover member 13__1 and stops the operation.

During an operation of the sound timer, if an customer pulls out bills from the cover member 13__1, the ATM terminates an operation for providing bills to a customer.

During an operation of the sound timer, if an customer does not pull out bills from the cover member 13__1 and the customer depresses the button "*", the process goes to steps S229~S232 in which the ATM finally takes bills into the cover member 13__1 and stops the operation.

During an operation of the sound timer, if an customer does not pull out bills from the cover member 13__1 and the customer depresses the button "#"but not the button "*", the process goes to steps S226~S228.

In steps S226~S228, the ATM performs the same operation as that in steps S212~S214. That is, the time extension means 11__1a of medium discharge control unit 11__1 increments the number of times of timer extension of the timer extension counter 11__4 by one, and causes the voice generating unit 11__2 to terminate the audio guide D and generate an audio guide E. The audio guide E is announced through the receiver 18__1. And the process returns to the step S203.

Again the process starts from the step S203, and the silent timer and the sound timer are cleared and then the silent timer restarts, so that the timer may be substantially extended. The timer extension is determined in the number of times of timer extension in the step S203 in the manner as mentioned above, and is performed three times in maximum.

The example of processing of ATM represented by the flowchart of FIG. 4 will be explained in conjunction with FIGS. 5 and 6. Hereinafter, it is assumed that the silent timer time and the sound timer time are set to 10 seconds.

Figure 5:
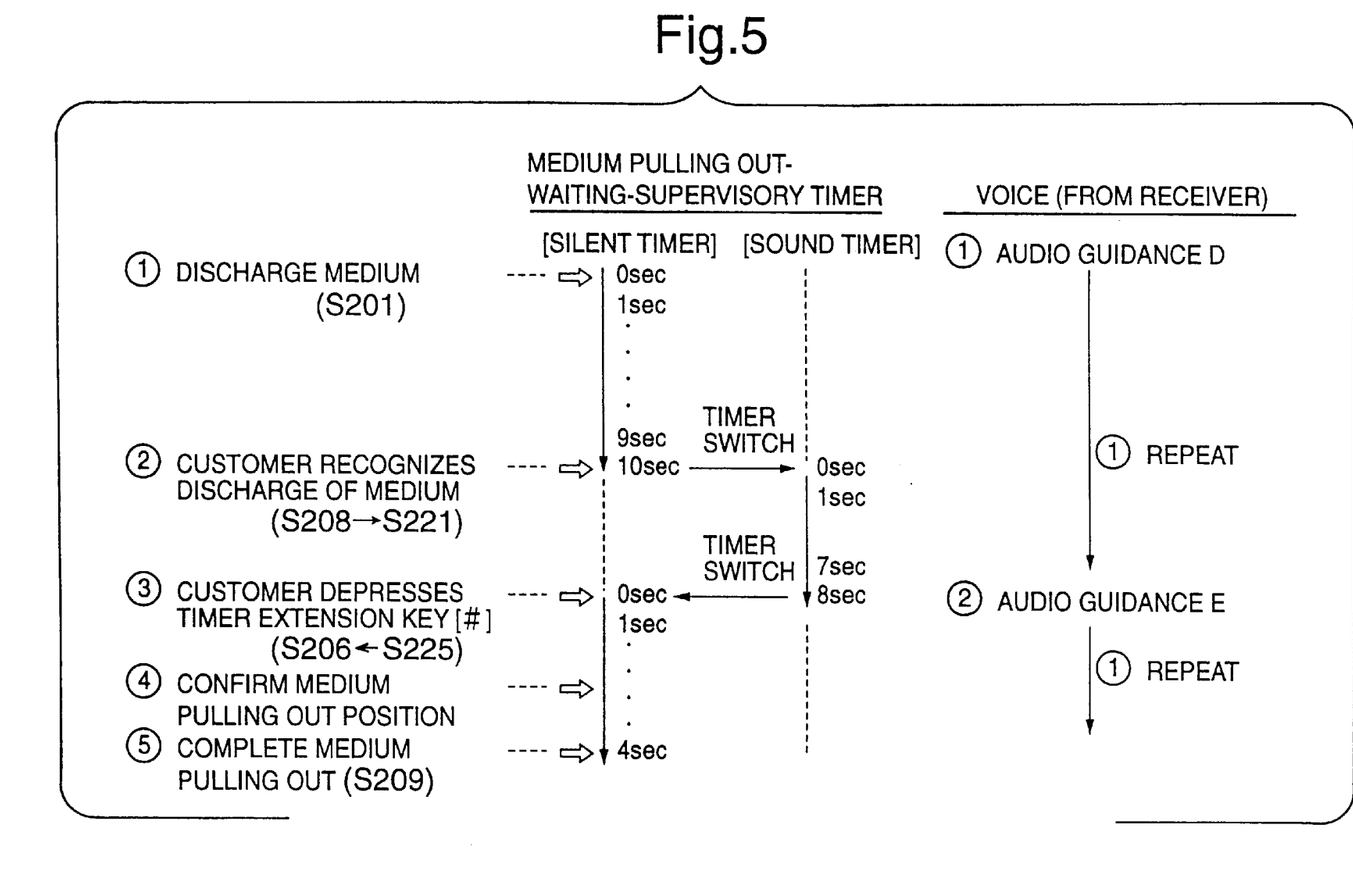
FIG. 5 is an illustration showing an example of a timer extension in the flowchart shown in FIG. 4.

FIG. 5 is an illustration showing an example of a timer extension in the flowchart shown in FIG. 4.

Bills are discharged from the cover member 13__1 (step S201), and immediately after the silent timer starts from 0 second (step S206). At that time the audio guide D is announced from the receiver 18__1 (step S207).

Thereafter, the audio guide D is repeated through the receiver 18__1 (a loop of steps S208~S211) 10 seconds. As the silent timer times 10 seconds elapsed to time out (S208), the sound timer starts (S221). When the sound timer times eight seconds elapsed (a loop of steps S222~S225), a customer depresses "#" button on the receiver 18__1 (step S225), and the silent timer starts from 0 second (S206). Here, the audio guide D is terminated (S227), and the audio guide E is announced through the receiver 18__1 once (step S228). Again the audio guide D is repeated through the receiver 18__1 (a loop of steps S208~S211). When the silent timer times four seconds elapsed, a customer confirms a pulling out position of bills and performs a pulling out of bills (S209).

According to the ATM as mentioned above, a time up to taking discharged bills into the cover member 13__1 is allowed to be extended. Thus, a customer can pull out the medium with an enough time. Further, according to the ATM as mentioned above, the extension of the time is performed in accordance with an operation of a customer. Thus, it does not happen that bills discharged from the cover member 13__1 are left in defenseless state for long time in accordance with the extension of the time. Therefore, it is possible to prevent a theft of the medium.

Figure 6:
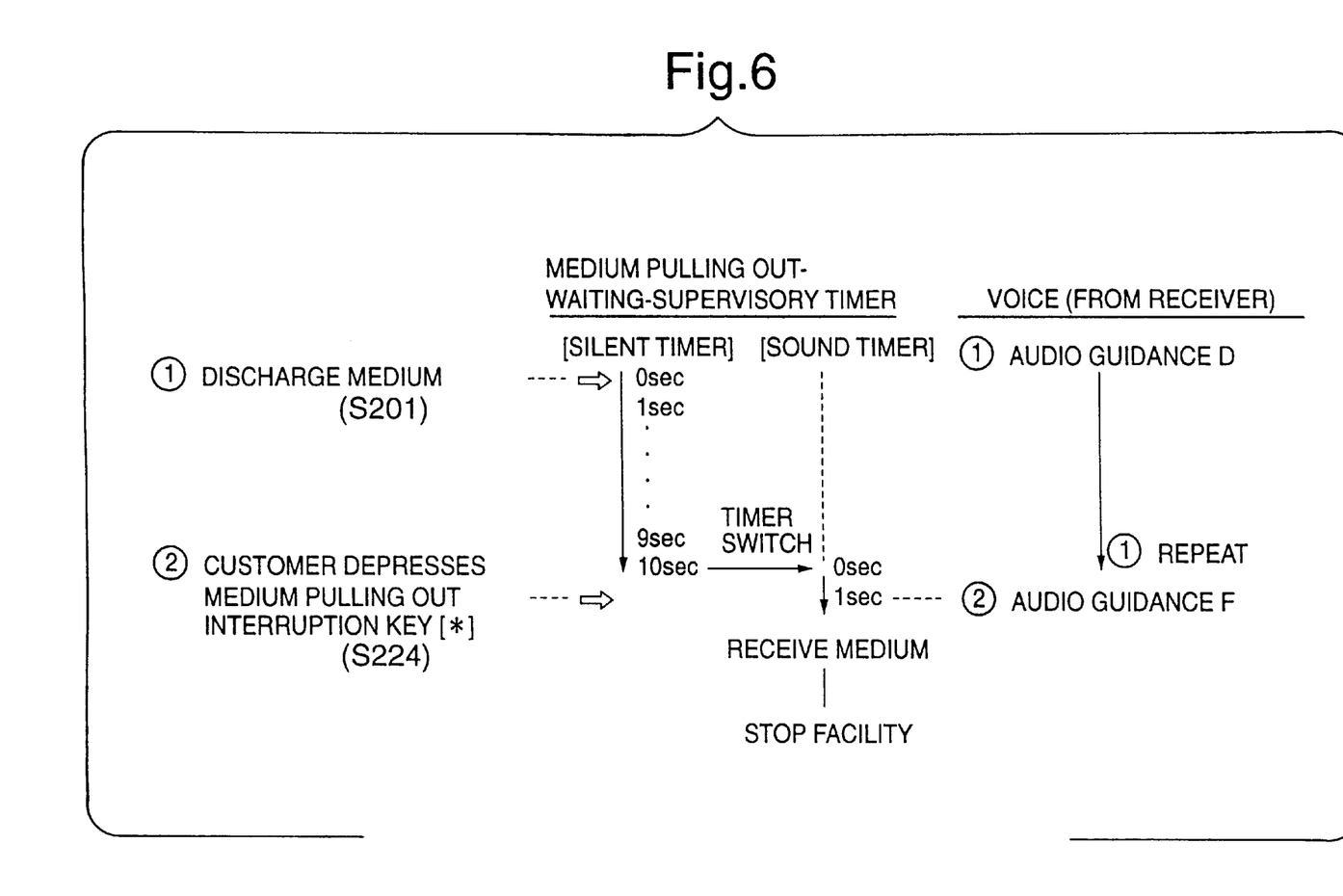
FIG. 6 is an illustration showing an example of a processing for a medium pulling out-waiting-interruption in the flowchart shown in FIG. 4.

FIG. 6 is an illustration showing an example of a processing for a medium pulling out-waiting-interruption in the flowchart shown in FIG. 4.

Bills are discharged from the cover member 13__1 (step S201), and immediately after the silent timer starts from 0 second (step S206). At that time the audio guide D is announced from the receiver 18_1 (step S207). Thereafter, the audio guide D is repeated through the receiver 18_1 (a loop of steps S208~S211) 10 seconds. As the silent timer times 10 seconds elapsed to time out (S208), the sound timer starts (S221). These processes are same as those in FIG. 5. Thereafter, when the sound timer times one second elapsed (a loop of steps S222~S225), a customer depresses "*" button on the receiver 18_1 (step S224). Then the audio guide D is terminated (S229), and the audio guide F is announced through the receiver 18_1 once (step S230). And bills are taken into the cover member 13_1 (step S231) and the ATM stops (step S232).

In this manner, according to the ATM as mentioned above, taking bills discharged from the cover member 13_1 into the cover member 13_1 is performed in accordance with a button operation on the receiver 18_1 by a customer before the lapse of the above-mentioned predetermined time. Thus, for example, in the event that the customer abandon to seek the bills by oneself and calls a person in charge, this taking in makes it possible to prevent a theft of the bills.

As mentioned above, according to the present invention, there are provided a consumer transaction facility in which a time until a medium, such as a bill ai a card, discharged from a cover member, is automatically taken into the cover member, is extended in accordance with an operation so that a sufficient time for pulling out of the medium is provided for a visually handicapped person, and capable of preventing a theft of the medium, a consumer transaction facility in which a medium discharged from a cover member is taken into the cover member in accordance with an operation and thereby preventing a theft of the medium, and a consumer transaction facility in which a discharge of a medium to be expected is interrupted in accordance with an operation so that a time for preparations for pulling out of the medium is provided for a visually handicapped person, and capable of preventing a theft of the medium.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention

What is claimed is:

1. A consumer transaction facility for performing a discharge of a medium including cash from a cover member in accordance with an operation of a customer, said consumer transaction facility comprising:

a receiver having an operating button; and a medium discharge control unit for discharging the medium from the cover member, and in a case where the medium is left at a lapse of a predetermined time, taking the medium into the cover member, wherein said medium discharge control unit has time extension means for extending a time up to taking the discharged medium into the cover member in accordance with the operating button on said receiver after a discharge of the medium.

2. A consumer transaction facility for performing a discharge of a medium including cash from a cover member in accordance with an operation of a customer, said consumer transaction facility comprising:

a receiver having an operating button; and a medium discharge control unit for discharging the medium from the cover member, and in a case where the medium is left at a lapse of a predetermined time, taking the medium into the cover member, wherein said medium discharge control unit has time interruption means for taking the discharged medium into the cover member in accordance with the operating button on said receiver after a discharge of the medium before a lapse of the predetermined time.

3. A consumer transaction facility for performing a discharge of a medium including cash from a cover member in accordance with an operation of a customer, said consumer transaction facility comprising:

a receiver having an operating button; and a medium discharge control unit for discharging the medium from the cover member, and in a case where the medium is left at a lapse of a predetermined time, taking the medium into the cover member, wherein said medium discharge control unit has discharge extension means for extending a time at which discharge of the medium occurs in accordance with an operation of the operating button on said receiver before the discharge of the medium, and performing the discharge of the medium in accordance with a new operation of the operating button on said receiver.

* * * * *